G. G. GREEN.
HAND POWER HAY BALER.
APPLICATION FILED FEB. 24, 1912.
1,049,704.
Patented Jan. 7, 1913.
3 SHEETS—SHEET 3.
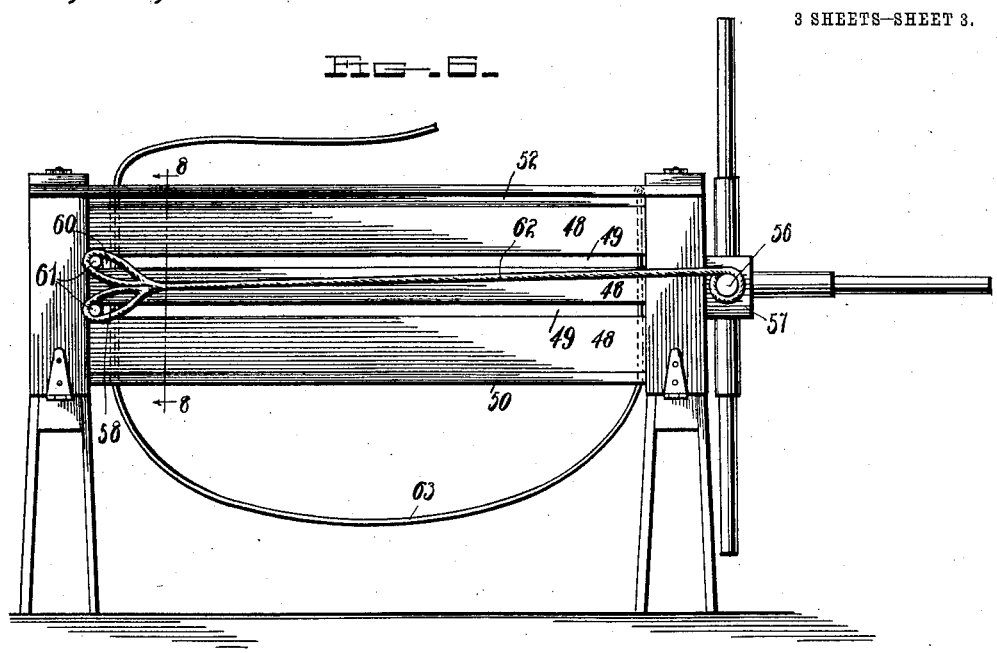
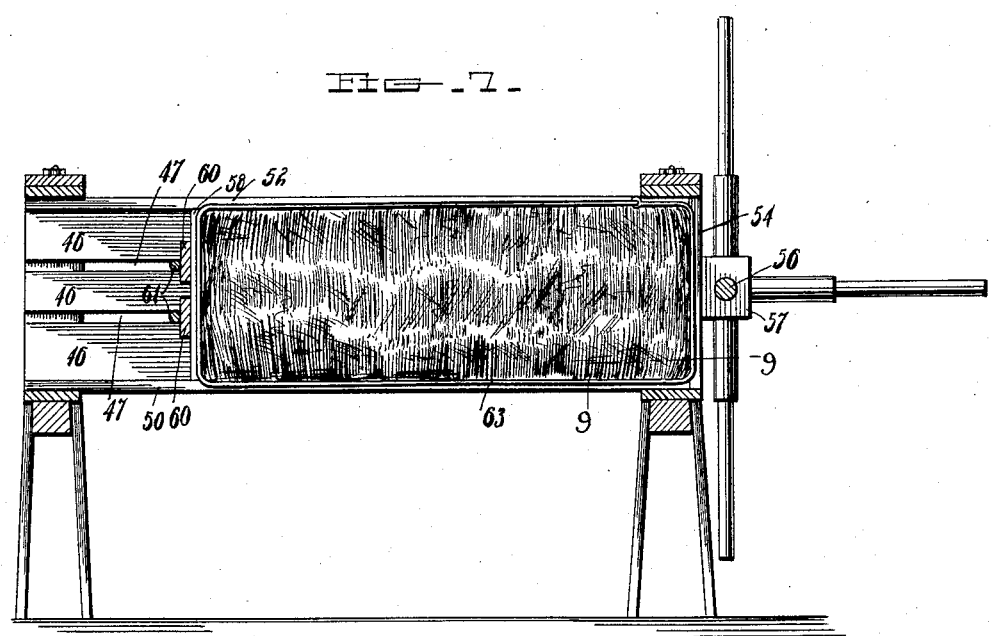
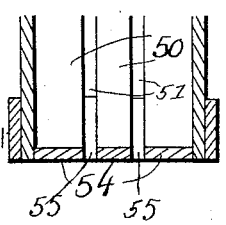

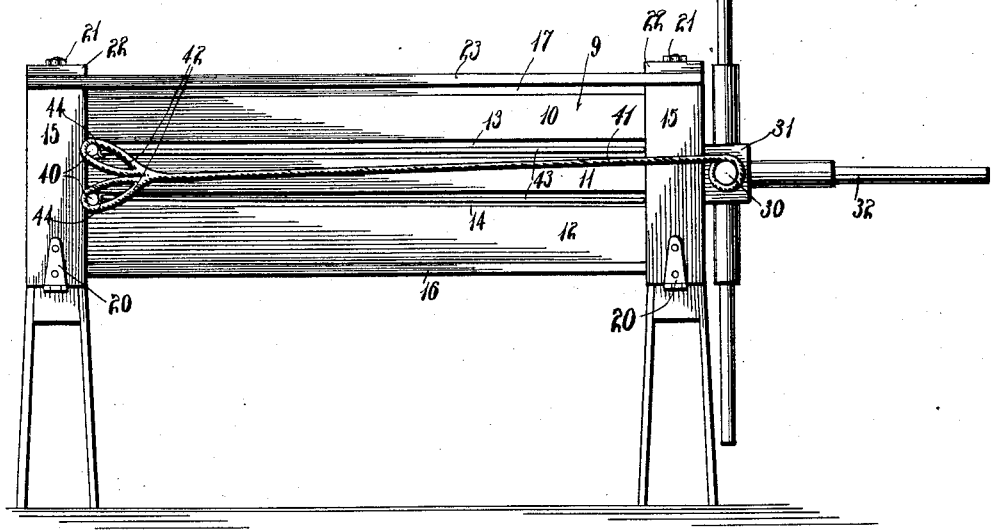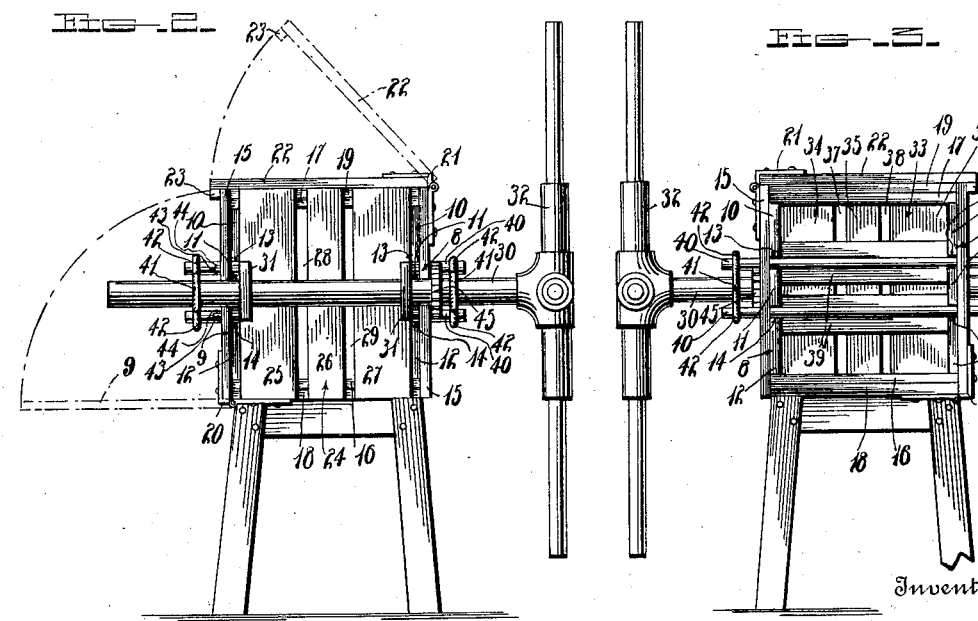

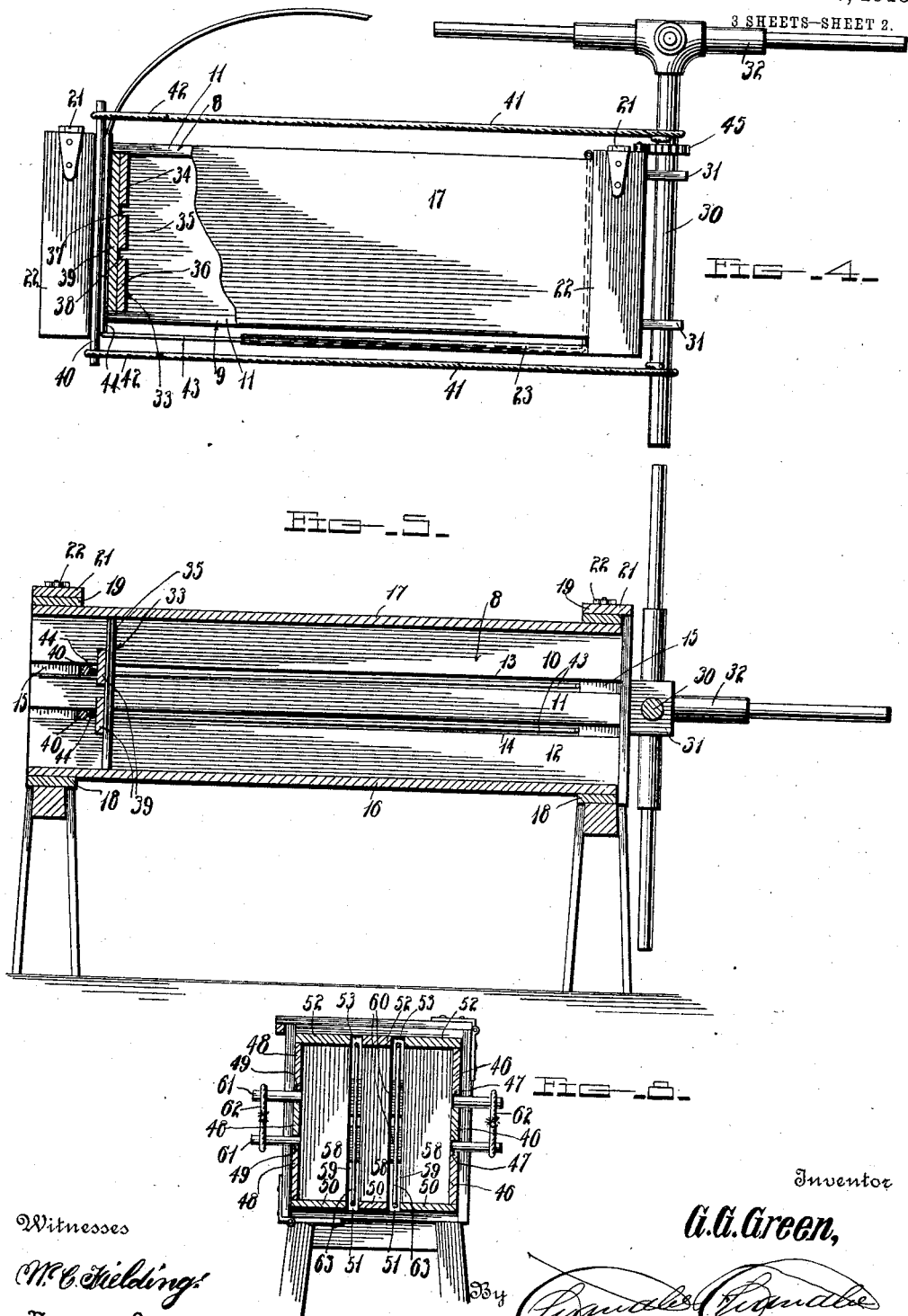

UNITED STATES PATENT OFFICE.

GEORGE GORDON GREEN, OF BATTELLE, ALABAMA.

HAND-POWER HAY-BALER.

1,049,704.

Specification of Letters Patent.  Patented Jan. 7, 1913.

Application filed February 24, 1912. Serial No. 679,701.

*To all whom it may concern:*

Be it known that I, GEORGE GORDON GREEN, a citizen of the United States, residing at Battelle, in the county of Dekalb, State of Alabama, have invented certain new and useful Improvements in Hand-Power Hay-Balers; and I do hereby declare the following to be a full, clear, and exact description of the invention, such as will enable others skilled in the art to which it appertains to make and use the same.

This invention relates to hay presses and has for an object to provide an extremely simple and inexpensive hay press that may be operated by hand and will be so constructed as to permit of easily applying the baling wires and will further be so constructed as to permit of the removal of a finished bale with minimum manual exertion.

A still further object is to provide a novel presser head with novel actuating means therefor, the presser head being removably mounted within the casing so as not to obstruct removal of the finished bale.

With the above objects in view the invention consists of certain novel details of construction and combination of parts hereinafter fully described and claimed, it being understood that various modifications may be made in the minor details of construction within the scope of the appended claim.

In the accompanying drawings forming part of this specification:—Figure 1 is a side elevation of the device. Fig. 2 is a rear elevation of the device. Fig. 3 is a front elevation of the device. Fig. 4 is a plan view of the device, with parts broken away. Fig. 5 is a longitudinal sectional view through the device. Fig. 6 is a side elevation of a modified form of the device. Fig. 7 is a longitudinal sectional view through the modified form showing the completed bale therein equipped with the binding wires. Fig. 8 is a cross sectional view taken on the line 8—8 Fig. 6. Fig. 9 is a sectional view on line 9—9 of Fig. 7.

Referring now to the drawings in which like characters of reference designate similar parts, the device is shown to comprise a casing consisting of a stationary side wall 8 and a hinged side wall 9 each formed preferably of three spaced superposed boards 10, 11 and 12 with resultant parallel slots 13 and 14 therebetween, the boards of each wall being connected together terminally by upright cleats 15. An imperforate stationary bottom 16, and an imperforate hinged cover 17 connect the side walls, the bottom wall being externally equipped at the ends with transverse cleats 18, and the cover being similarly equipped with transverse cleats 19, the cleats of both bottom and cover bearing upon the cleats of the side walls.

The hinged side wall is connected to the bottom through the instrumentality of leaf hinges 20 disposed on the cleats of the respective parts, and the hinged cover is connected to the stationary side wall through the instrumentality of hinges 21 arranged on the cleats of the stationary side wall and upon cleats 22 carried by and extending beyond the cover, these latter cleats being terminally connected by a longitudinal strip 23 which is adapted to bear upon the outer face of the hinged side wall and prevent opening of the latter during the baling operation.

A stationary end wall 24 closes one end of the casing and consists preferably of three upright boards 25, 26 and 27 with resultant parallel slots 28 and 29 therebetween, the boards being rigidly secured to the bottom. A windlass in the nature of a shaft 30 is secured in bearings 31 carried by the end wall and is terminally equipped with radial hand spokes 32 which forms means for rotating the windlass.

A sliding presser head 33 closes the opposite end of the casing, and consists preferably of three upright boards 34, 35 and 36 with resultant slots 37 and 38 therebetween, these boards being connected by spaced cross cleats 39 disposed on opposite sides of the centers of the boards. The head is designed to be moved in the direction of the stationary end wall and to attain this end spaced rods 40 are inserted through the slots in both side walls and bear upon the cleats 39. Draw cables 41 are arranged upon opposite sides of the casing each cable being terminally attached to the windlass shaft at one end and being provided at the opposite end with loops 42 which receive the projecting ends of both rods. Upon the windlass being actuated the presser head will be advanced in the direction of the stationary end wall.

In operation, the baling wires 43 are passed through the slots in the stationary wall and thence through the slots in the hinged wall, being thence carried externally and longitudinally along the hinged wall and passed through short lengths of pipe 44 which are placed in the slots of both walls and extends across the inner face of the presser head, the terminals of the wires emerging on the same side of the casing from whence they enter the casing as will be seen by referring to Fig. 4. The cover is now opened, and the hay passed into the casing, the cables 41 holding the hinged wall in upright position meanwhile. After a predetermined amount of hay has accumulated in the casing, the cover is closed, and may be held in this position by a weight or otherwise, and then the windlass is actuated to draw the presser head in the direction of the stationary end wall and compress the hay to the desired extent, the ratchet and pawl 45 of the windlass carried by the stationary side wall prevents retrograde movement of the presser head. The projecting tubes or pipes 44 are now withdrawn from the casing over the free ends of the baling wires, and both terminals of each baling wire twisted together. The cover is now opened, the windlass unwound and the hinged side wall rocked open. The completed bale is now withdrawn manually from the casing and the parts returned to their normal positions for forming the new bale.

In Fig. 6 is shown a modification of the device. This modification differs only from the preferred form in the construction of the bottom and cover, and in the manner of inserting the baling wires. Referring to the views of the modification, the casing is shown to comprise a stationary side wall formed of spaced boards 46 with resultant slots 47 therebetween, a hinged side wall formed with spaced boards 48 with resultant slots 49 therebetween, a stationary bottom formed of three spaced boards 50 with resultant slots 51 therebetween, and a hinged cover formed of three spaced boards 52 with resultant slots 53 therebetween, the slots of the side walls alining, and the slots of the cover and bottom alining.

A stationary end wall closes one end of the casing and consists of spaced boards 54 with resultant slots 55 therebetween and a windlass shaft 56 secured in bearings 57 carried by the end wall. A presser head is fitted in the opposite end of the casing from the stationary end wall, and comprises preferably three spaced boards 58 with resultant slots 59 therebetween. Transverse cleats 60 connect the boards 58. Rods 61 are inserted through the slots in both side walls and bear upon the outer faces of the cleats. Draw cables 62 are secured to the windlass shaft and to the projection terminals of both rods as shown.

In the modification above described, the binding wires 63 are passed downwardly through the registering slots of the bottom and cover with the ends resting upon the ground until the baling operation has been completed. The terminals of the wires are then passed upwardly through the slots 59 existing between the boards of the presser head, and then trained through the slots of the cover, the terminals of the wires being finally twisted together to secure the bale.

From the above description it will be seen that an extremely simple and inexpensive hay baling device is presented, and furthermore by virtue of the novel arrangement of the hinged side and cover, the casing may be quickly opened to permit removal of the finished bale.

What is claimed, is:—

A hay baler including a casing comprising a bottom, spaced side walls having alining slots therein, a cover connecting the side walls, an end wall, a sliding presser head adapted to be moved toward and away from said end wall, a windlass carried by said end wall, spaced rods engaged through said alined slots and bearing against the outer face of said presser head, a draw cable on each side of the hay baler connected at one end to a corresponding end of the windlass shaft and having a bifurcation at the opposite end the branches of which terminate in loops which encircle the corresponding ends of both of said rods, said cables operating to draw said rods uniformly toward said windlass with a resultant even advance of said presser head in performing its function, and spaced baling wire receiving tubes engaged through said slots and bearing against the inner face of said presser head.

In testimony whereof, I affix my signature, in presence of two witnesses.

GEORGE GORDON GREEN.

Witnesses:
W. M. POE,
R. P. RAMSEY.

Copies of this patent may be obtained for five cents each, by addressing the "Commissioner of Patents, Washington, D. C."